United States Patent
Kaneda

(10) Patent No.: US 8,278,228 B2
(45) Date of Patent: Oct. 2, 2012

(54) SOUND ABSORBING MATERIALS AS VEHICLE EXTERIOR EQUIPMENT AND MANUFACTURING METHOD THEREOF

(75) Inventor: Tatsuo Kaneda, Iwata (JP)

(73) Assignee: Marusho Natsuyama Felt Co., Ltd., Shizuoka (JP)

( * ) Notice: Subject to any disclaimer, the term of this patent is extended or adjusted under 35 U.S.C. 154(b) by 408 days.

(21) Appl. No.: 12/225,713

(22) PCT Filed: Mar. 28, 2007

(86) PCT No.: PCT/JP2007/056615
§ 371 (c)(1),
(2), (4) Date: Sep. 29, 2008

(87) PCT Pub. No.: WO2007/114154
PCT Pub. Date: Oct. 11, 2007

(65) Prior Publication Data
US 2009/0117806 A1 May 7, 2009

(30) Foreign Application Priority Data
Mar. 28, 2006 (JP) .................... 2006-087211

(51) Int. Cl.
| B32B 5/16 | (2006.01) |
| B32B 5/02 | (2006.01) |
| B32B 27/14 | (2006.01) |
| B32B 27/02 | (2006.01) |
| D04H 1/00 | (2006.01) |
| B05D 1/12 | (2006.01) |
| B05D 3/00 | (2006.01) |
| B05D 3/02 | (2006.01) |

(52) U.S. Cl. .............. 442/417; 442/70; 442/72; 442/74; 442/76; 442/77; 427/180; 427/189; 427/195; 427/331; 427/375; 427/394

(58) Field of Classification Search .................... 442/61, 442/68–76, 417
See application file for complete search history.

(56) References Cited

U.S. PATENT DOCUMENTS
4,396,663 A * 8/1983 Mitchell et al. ............... 428/111
(Continued)

FOREIGN PATENT DOCUMENTS
EP 1 365 388 11/2003
(Continued)

OTHER PUBLICATIONS

Chemnetbase, Polyethylene Properties, published online, downloaded Nov. 30, 2010.*
(Continued)

Primary Examiner — Jennifer A Steele
(74) Attorney, Agent, or Firm — Wenderoth, Lind & Ponack, L.L.P.

(57) ABSTRACT

A sound absorbing material 10 as vehicle exterior equipment according to the present invention includes a non-woven fabric 20 including a main fiber and a binder fiber. In the sound absorbing material 10 as vehicle exterior equipment, powdery resin is applied to the surface 20a of the non-woven cloth 20. The powdery resin and the non-woven fabric 20 are heated, compressed and cooled to form a resin layer 30. The resin layer 30 is porous due to particle residue parts 30b where parts of the powdery resin remain in particulate form. The non-woven fabric 20 of the sound absorbing material 10 as vehicle exterior equipment can be constituted from two types of non-woven fabrics 22, 24 superimposed together.

14 Claims, 4 Drawing Sheets

U.S. PATENT DOCUMENTS

| | | | |
|---|---|---|---|
| 6,737,372 B2 * | 5/2004 | Minami et al. | 442/340 |
| 7,080,712 B2 | 7/2006 | Tsuiki et al. | |
| 2004/0053003 A1 | 3/2004 | Coates et al. | |
| 2004/0055813 A1 | 3/2004 | Tsuiki et al. | |
| 2004/0248490 A1 | 12/2004 | Hyuga et al. | |

FOREIGN PATENT DOCUMENTS

| | | |
|---|---|---|
| JP | 59-091134 | 5/1984 |
| JP | 3-90336 | 4/1991 |
| JP | 4-209771 | 7/1992 |
| JP | 2827018 | 9/1998 |
| JP | 11-44014 | 2/1999 |
| JP | 2002-178848 | 6/2002 |
| JP | 2002-348767 * | 12/2002 |
| JP | 2003-122373 | 4/2003 |
| JP | 2004-504517 | 2/2004 |
| JP | 3568936 | 6/2004 |
| JP | 2004-359066 | 12/2004 |
| JP | 3675359 | 5/2005 |
| WO | 02/059870 | 8/2002 |

OTHER PUBLICATIONS

Japanese Search Report issued Sep. 30, 2008 in the corresponding Japanese application with English translation.

Japanese Search Report issued Apr. 7, 2009 in the corresponding Japanese application with English translation.

International Search Report issued May 1, 2007 in the International (PCT) Application of which the present application is the U.S. National Stage.

* cited by examiner

SOUND ABSORBING MATERIALS AS VEHICLE EXTERIOR EQUIPMENT AND MANUFACTURING METHOD THEREOF

TECHNICAL FIELD

The present invention relates to a sound absorbing material as vehicle exterior equipment and a manufacturing method thereof. In particular, it relates to a sound absorbing material as vehicle exterior equipment well suited to be a fender liner installed in a tire side of a vehicle tire house and a manufacturing method thereof.

BACKGROUND ART

A conventional sound absorbing material for an automobile comprising a felt material and a flame-resistant resin layer is known (for example, refer to Japanese Patent No. 3568936, (pages 3-5, FIG. 2), (Patent document 1)).

This sound absorbing material is obtained by applying a highly-viscous latex made of a flame-resistant resin as a coating to a felt material 2 so that a flame-resistant resin layer is formed on the surface of the felt material 2 and an independent fabric layer 8 remains whereby high sound absorbing properties are realized at medium and high sound ranges.

Another material including non-woven fabrics and a water-resistant film is known as a sound absorbing material as vehicle exterior equipment (for example, refer to Japanese Patent No. 3675359, (pages 2-4, FIG. 1) (Patent document 2)).

The sound absorbing material 11 as vehicle exterior equipment described in Patent Document 2 applies press molding in a state in which the water-resistant film 22 is closely attached to the surface of a fabric web 21 having a sheet shape and the two are mutually adhered.

A material as vehicle exterior equipment including a non-woven fabric with one surface of a predetermined surface roughness and friction coefficient is known in other conventional technologies (for example, refer to JP2004-359066A, (page 9-10, FIG. 3) (Patent document 3)).

According to Patent document 3, a first fiber aggregate and a second fiber aggregate are superimposed, heated and press molded. Thereby a material as vehicle exterior equipment including a layer 23 of the tire house side and a layer 22 of the tire side is manufactured.

By the way, it is desirable that foreign substances such as water, dust and dirt or the like do not adhere to a sound absorbing material used as vehicle exterior equipment. In particular, when a fender liner disposed in a tire house is used in a snowy area, once water, dirt, snow and ice or the like are adhered to the fender liner, it is not preferable that snow be further attached to the adhered substances or ice grows in the periphery of the adhered substances.

In the case of manufacturing a sound absorbing material described in Patent document 1, a highly-viscous fire-retarding material (latex) is coated on the felt member 2 to be heated and press molded. However, such a fire-retarding resin layer 5 hardly transmits heat when heated. Therefore, there is a problem in that molding by hot pressing is difficult.

A sound absorbing material described in Patent document 2 applies press molding in a state in which the water-resistant film 22 is closely attached to the surface of the fiber web 21 having a sheet shape so that the water-resistant film 22 is adhered to the surface of the fiber web 21. The sound absorbing material is hereby press molded into a shape fitting in a vehicle body, but because the water-resistant film 22 hardly transmits heat, there is a problem in that moldability is poor.

Furthermore, ready-made water-resistant films are expensive so that the manufacturing cost is increased.

In a material as vehicle exterior equipment described in Patent document 3, a first fabric aggregate and a second fabric aggregate are superimposed, heated and press molded. The average deviation of surface roughness and friction coefficient of one surface are limited to below the predetermined values. However, in this material as vehicle exterior equipment, the outward facing portion is comprised from a fiber aggregate so that there are limitations to reducing the fluff of the fabric.

SUMMARY OF THE INVENTION

Problem to be Solved by the Invention

The present invention is directed to solve the above-described problems in conventional technologies. An object of the present invention is to provide a sound absorbing material as vehicle exterior equipment and a manufacturing method thereof that is, while maintaining sound absorbing capabilities, excellent in moldability, can be easily heated and manufactured cheaply and to which foreign substances like water, dirt, dust and snow or the like hardly adhere.

Means for Solving the Problem

To accomplish the above object, a sound absorbing material as vehicle exterior equipment according to an embodiment of the present invention includes a main fiber and a binder fiber, a non-woven fabric, and a powdery resin applied to the surface of the non-woven fabric, the powdery resin being heated to form a porous resin layer in which a portion of the powdery resin remains in particulate form.

Because a portion of the powdery resin remains in the resin layer in particulate form, minute pores are formed between particles so that the layer becomes ventilatory. External sounds can be absorbed by the non-woven fabric through the minute pores. In addition, the resin layer as an exterior equipment material has, in particular, a water-repellent property in which foreign substances hardly adhere. Therefore, this sound absorbing material as vehicle exterior equipment has high sound absorbing capabilities and high water-repellent capabilities.

In general, in order to achieve a flat, smooth surface of the resin layer, special process flows are required so that the manufacturing cost is increased. However, such smoothing is not necessary for the surface of the resin layer used in this sound absorbing material as vehicle exterior equipment so that a cheap and easy to manufacture sound absorbing material is realized.

DESCRIPTION OF THE NUMERALS

| | |
|---|---|
| 10 | fender liner |
| | (sound absorbing material as vehicle exterior equipment) |
| 20 | non-woven fabric |
| 20a | surface |
| 20b | boundary surface |
| 22 | first non-woven fabric |
| 30c | resin particles |
| 24 | second non-woven fabric |
| 30 | resin layer |
| 30a | fusion bonded resin part |
| 30b | particle residue parts |
| 21 | exposure fabric |

DETAILED DESCRIPTION OF THE INVENTION

A sound absorbing material as vehicle exterior equipment according to the present invention and a manufacturing method thereof are described hereinbelow with reference to the drawings.

The sound absorbing material according to the present invention is used as a material for vehicle exterior equipment where sound absorbing capabilities and non-adherence capabilities (especially water-repellent properties) against foreign substances on the surface are required. In particular, the sound absorbing material is suitably used as a fender liner installed in a tire house of a vehicle.

Figure 1:
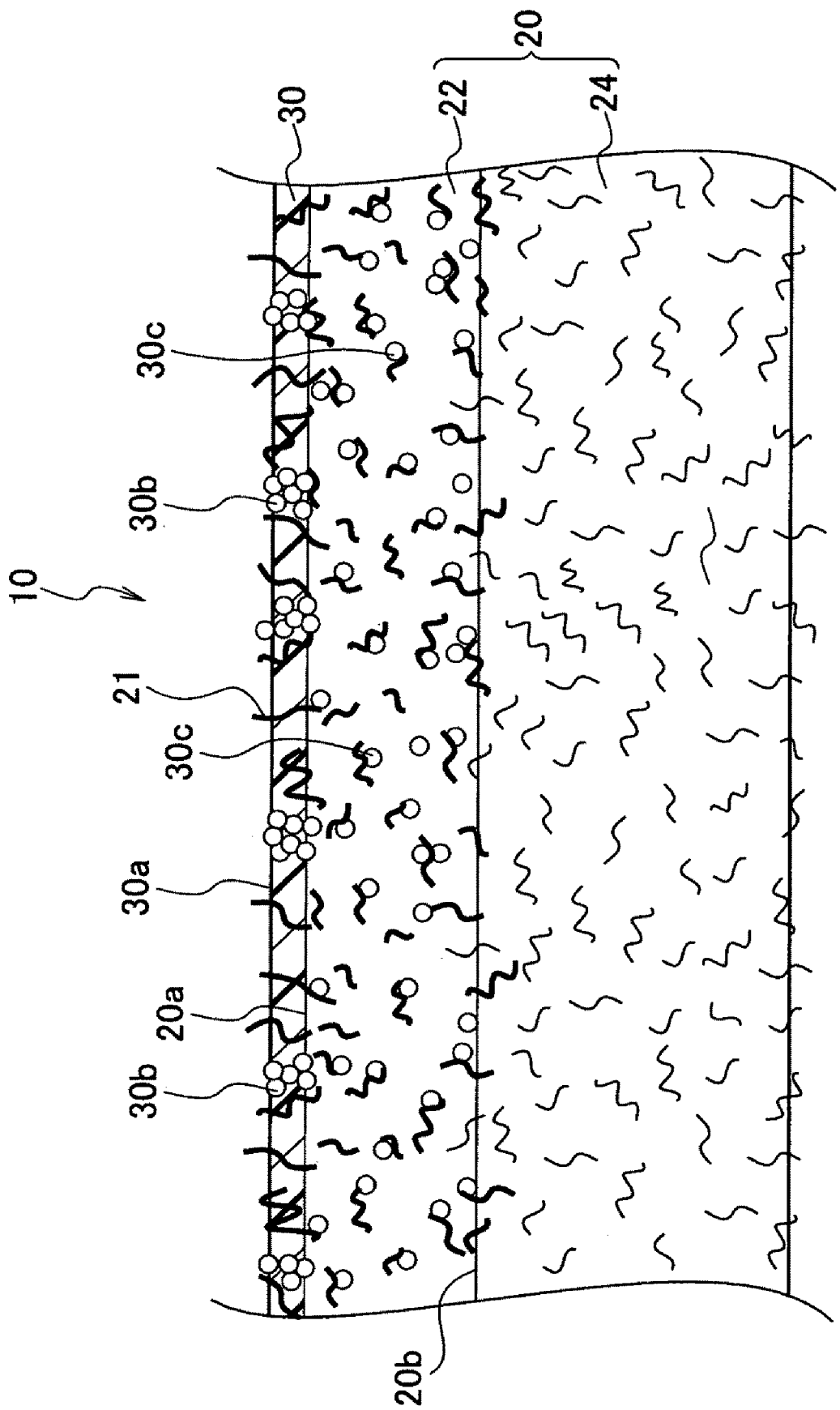
FIG. 1 is a frame format illustrating a cross-section of a fender liner used as a sound absorbing material as vehicle exterior equipment according to an embodiment of the present invention.

As illustrated in FIG. 1, a fender liner 10 used as a sound absorbing material as vehicle exterior equipment according to an embodiment of the present invention constitutes a non-woven fabric 20 including a main fiber and a binder fiber. A porous resin layer 30 having water-repellent properties is formed on the surface of the non-woven fabric 20.

A powdery resin is applied to the surface 20a of the non-woven fabric 20 to be heated together with the non-woven fabric 20 and compressed thereof so that the resin layer 30 is formed. More specifically, the resin layer 30 includes a fusion bonding resin part 30a formed by melting the powdery resin (i.e., melted powdery resin particles) and particle residue parts 30b in which the powdery resins remains in particulate form (i.e., unmelted powdery resin particles). The fusion bonding resin part 30a and the particle residue parts 30b are distributed across the whole resin layer 30.

In this way, the powdery resin is not melted completely and remains in particulate form in the resin layer 30 so that gaps are formed between particles and the resin layer 30 becomes porous.

Furthermore, in this embodiment, a portion of the fabric of the non-woven fabric 20 is exposed as exposure fibers 21 from the surface of the resin layer 30 piercing through the resin layer 30. Minute pores can be formed easily in the periphery of the exposure fibers 21 piercing through the resin layer 30 from the non-woven fabric 20 in such a way so that ventilation characteristics can be easily secured.

The non-woven fabric 20 in this embodiment adopts a constitution of bonding two kinds of non-woven fabrics, that is, the first non-woven fabric 22 and the second non-woven fabric 24 are bonded together so that the resin layer 30 is formed on the side of the first non-woven fabric 22.

The powdery resin enters the first non-woven fabric 22 and remains in particulate form (resin particles 30c). The surface of the resin particles 30c is melted-through so that the resin particles are fusion bonded to the fabric of the first non-woven fabric 22. Because the resin particles 30c exist in the first non-woven fabric 22 in particulate form and are fusion bonded to the fibers of the first non-woven fabric 22, ventilation characteristics can be easily secured and hardness can be heightened.

In the present embodiment, resin particles 30c enter the first non-woven fabric 22 up to a boundary surface 20b, but a constitution can be adopted in which the resin particles 30c enter any middle part of the first non-woven fabric or even enter the second non-woven fabric 24.

Hereby the fender liner 10 has a triple layered structure. But the boundary division of each layer need not be necessarily clarified. Fabrics and binders can confound and fuse in the boundary divisions. Such a fender liner 10 is used in a way in which the side of the second non-woven fabric 24 is installed, for example, in a tire house (fender) and the side of resin layer 30 faces outward.

The first non-woven fabric 22 includes a main fiber and a binder fiber as raw materials. The types of the main fiber and the binder fiber are not particularly limited, but the binder fiber should melt-through in a heating process afterwards and function as a binder, whereby the main fiber should remain as fabric.

For example, PET, rough cotton, nylon, PP, acryl and so on can be suitably used as the main fiber. Low melting point PP, low melting point PET, PE, epoxy and so on can be suitably used as the binder fiber. As raw materials of the first non-woven fabric 22, preferably, the main fiber is constituted from a polyethylene terephthalate fiber and the binder fiber is constituted from a low melting point polypropylene fiber and a low melting point polyethylene terephthalate fiber with a lower melting point than the polyethylene terephthalate fiber of the main fiber.

The polyethylene terephthalate (PET) and the polypropylene (PP) are well suited because they are cheap and easily obtainable so that the manufacturing cost can be reduced.

Weight per unit area of the first non-woven fabric is set to 300-500 g/m². If the polyethylene terephthalate fiber as the main fiber is selected from a range of 20-50 mass % and the low melting point polypropylene fiber or the low melting point polyethylene terephthalate fiber as the binder fiber is selected from a range of 50-80 mass %, the hardness, stiffness and water-repellent property of the first non-woven fabric 22 become higher so that snow accretion and ice accretion become easily detachable and less likely to reach a layer of the vehicle body side (the second non-woven fabric 24). Thereby, a sound absorbing material as vehicle exterior equipment well suited for a cold area can be manufactured.

As just described, by blending the binder fiber in a relatively high ratio to obtain a high weight per unit area, even if there is a hole in the completed resin layer 30 or a crack is generated, the first non-woven fabric 22 as an under layer has a high water-repellent property and hardness so that foreign substances hardly adhere to the defective part of the resin layer 30, thereby making it well suited for a fender liner.

On the other hand, in a sound absorbing material as vehicle exterior equipment for use in a warm area, the weight per unit area of the first non-woven cloth 22 is set to 100-300 g/m², the polyethylene terephthalate fiber as the main fiber is in a range of 50-70 mass % and the total of the low melting point polypropylene fiber and the low melting point polyethylene terephthalate fiber as the binder fiber is in a range of 30-50 mass %.

By adjusting the weight per unit area and the ratio of the binder fiber within such ranges, the sound absorbing material as vehicle exterior equipment for use in a warm area has a smaller weight per unit area and a lower ratio of binder fiber in comparison to the sound absorbing material as vehicle exterior equipment described above for use in a cold area. Therefore, the sound absorbing material as vehicle exterior equipment for use in a warm area is well suited because high hardness, stiffness and water-repellent property are not required in comparison to the case in a cold area.

Figure 2:
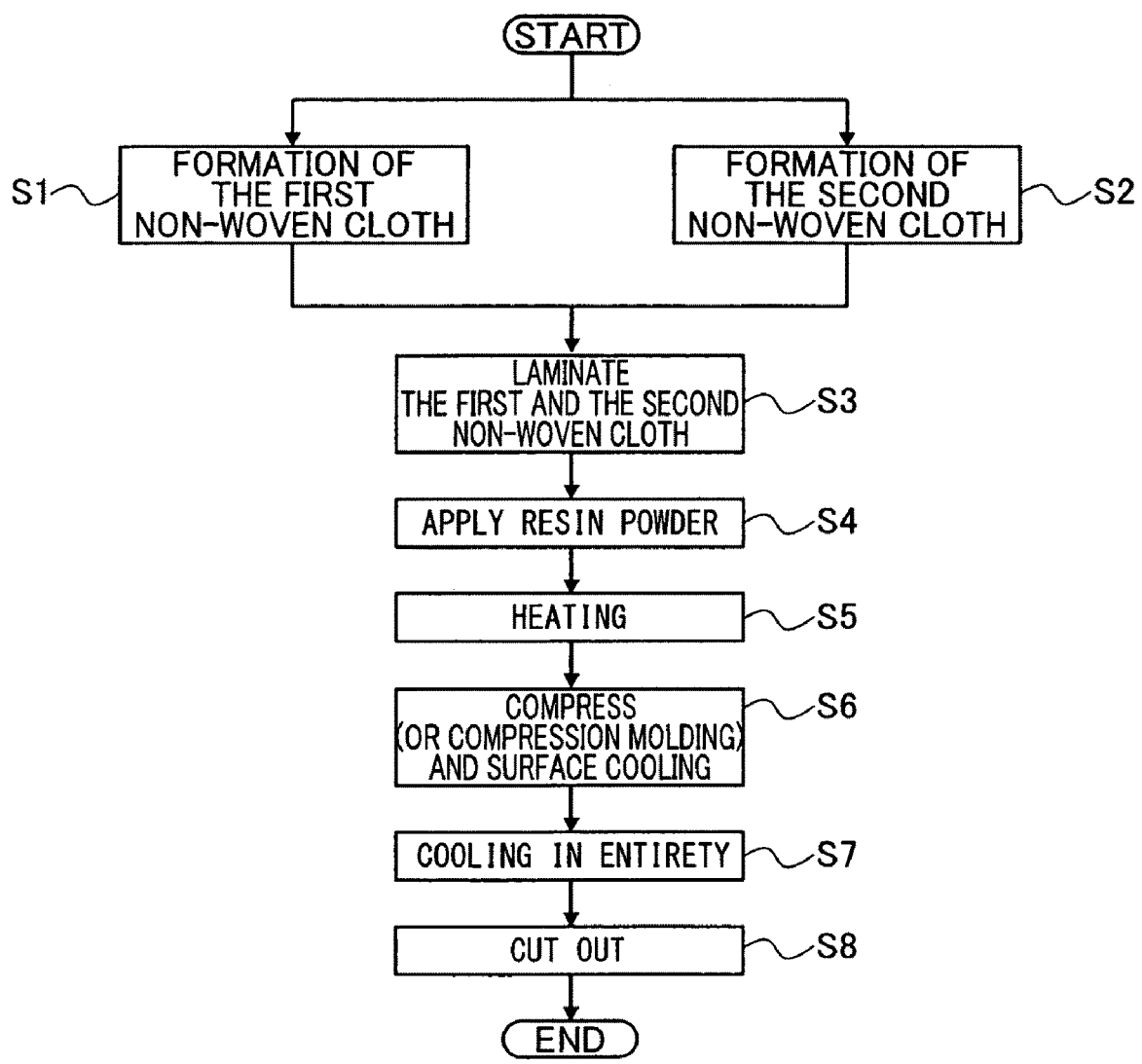
FIG. 2 is a flow chart illustrating a manufacturing method of a fender liner used as a sound absorbing material as vehicle exterior equipment according to an embodiment of the present invention.
Figure 3:
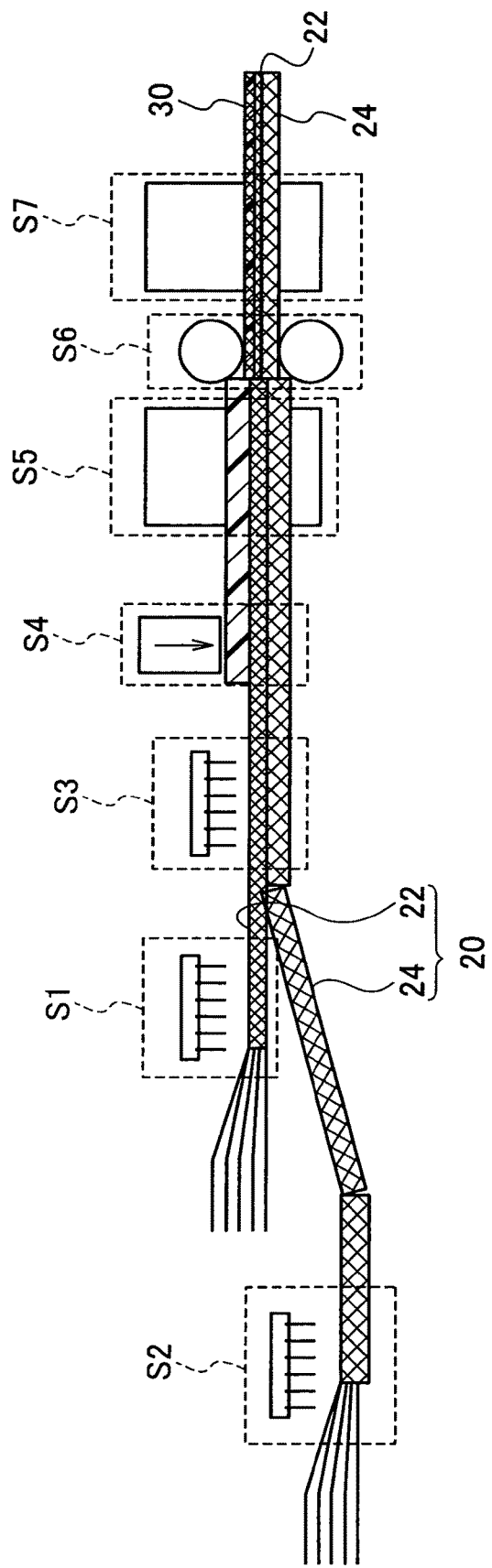
FIG. 3 is a frame format illustrating a manufacturing line of a fender liner used as a sound absorbing material as vehicle exterior equipment according to an embodiment of the present invention.

As illustrated in the flow chart of FIG. 2 and a schematic diagram of the manufacturing line of FIG. 3, first, the first non-woven fabric 22 is formed into a sheet shape by needling so that the main fiber and the binder fiber are mixed (confounded) (step S1).

The second non-woven fabric (layer) 24 includes a main fiber and a binder fiber as raw materials. The types of the main fiber and the binder fiber used for the second non-woven fabric 24 are not particularly limited, but the binder fiber should melt-through in a heating process afterwards and function as a binder, whereby the main fiber should remain as fiber. In order to realize high sound absorbing property, shape preserving property and shock absorbing property, the blending ratio of the main fiber becomes higher in comparison to the first non-woven fabric 22.

As raw materials of the second non-woven fabric 24, for example, PET, rough cotton, nylon, PP, acryl and so on can be suitably used as the main fiber. Low melting point PP, low melting point PET, PE, epoxy and so on can be suitably used as the binder resin. Preferably, a polyethylene terephthalate fiber is used as the main fiber. A low melting point polypropylene fiber and a low melting point polyethylene terephthalate fiber are respectively used as the binder fiber. These materials are well suited because they are cheap and easily obtainable.

Furthermore, the polyethylene terephthalate fiber as the main fiber is selected from a range of 30-50 mass %, the low melting point polypropylene fiber as the binder fiber is selected from a range of 10-40 mass %, the low melting point polyethylene terephthalate fiber as the binder fiber is selected from a range of 10-60 mass % (the binder fabric as a total is in a range of 50-70 mass %). In particular, by increasing the ratio of the main fiber in the second non-woven fabric 24 which is situated in a bottom layer (the vehicle body side) when viewed from the vehicle exterior, the porosity of the second non-woven fabric 24 becomes high so that an excellent sound absorbing property, shape preserving property and shock absorbing property can be realized.

First, the second non-woven fabric 24 is formed into a sheet shape by needling so that the main fiber and the binder fiber are mixed (confounded) (step S2).

The sequence of the processes (step S1 and S2) that form the first non-woven fabric 22 and the second non-woven fabric 24 into a sheet shape is random and the two can be manufactured in parallel. As illustrated in FIG. 3, it is also possible to manufacture in a unified line that includes all the processes after the step S1 and the step S2.

Next, the first non-woven fabric 22 and the second non-woven fabric 24 are laminated and bonded together (step S3).

In an embodiment of the present invention, one surface of the second non-woven fabric 24 and an underside surface of the first non-woven fabric 22 are superimposed. The two laminated layers thereby are subjected to needling. Therefore, the binder fiber not only has adhesive functions, but physically the first non-woven fabric 22 and the second non-woven fabric 24 can agglutinate by confounding. Especially because the second non-woven fabric 24 has a relatively low ratio of binder resin, this joining needling process is useful in that the two layers can be possibly agglutinated by confounding.

Next, a powdery resin is applied to the first non-woven fabric 22 of this two layered sheet (step S4).

Specifically, the powdery resin is applied to the surface 20a of the first non-woven fabric 22 (that is, the surface of the non-woven fabric 20).

By applying powdery resins as such but not resin films or the like, and by appropriately selecting the applied quantity, the particle diameter and the density, the adjustment of the water-repellent property on the surface of the finished product becomes easy. Furthermore, powdery resins (resin powder) are cheaper than resin films so that cost is also reduced.

Various resins can be utilized as the powdery resin but it is necessary to use resins with a lower melting point than the main fiber of the first non-woven fabric 22 and the main fiber of the second non-woven fabric 24. Thereby each main fiber remains as fibers even when the powdery resins are melted-through so that sound absorbing properties and shock absorbing properties or the like can be possibly exhibited.

Specifically, for example, PE, PP, EVA (ethylene-vinyl acetate) and so on can be used as powdery resins.

The density of the powdery resins can be appropriately selected from a random range but preferably, it is above 0.91 and below 0.965 g/cm$^3$ or more preferably above 0.91 and below 0.954 g/cm$^3$.

Polyethylene powders in such a density range have high fluidity so that in the application process S4, the applied quantity can be easily adjusted. As a result, the adjustment of water-repellent property and porosity becomes easy so that quality control becomes easy. In addition, the polyethylene powders with such a density range can easily remain partially in particulate form in a heating process afterwards so that the formation of a porous resin layer becomes easy. Furthermore, because the polyethylene powders remain in particulate form, air ventilation is possible before the melting in the initial stage of the heating process and heat can easily transmit to other layers so that the molding processing becomes easy.

In addition, by spraying silicon oil in combination with the application of the powdery resin, water repellent properties of the resin layer of the post-manufacture sound absorbing material as vehicle exterior equipment can be further improved. A portion of the powdery resin applied as such enters the first non-woven cloth 22.

Next, a sheet body constituted from a triple layered structure of the second non-woven fabric, the first non-woven fabric and the applied powdery resin layer is heated (step S5).

The heating process is performed by adjusting the heating temperature and the heating time so that the powdery resin partially maintains the particulate form. That is, a portion of the powdery resin is melted-through and the remaining portion of the powdery resin is half melted-through so that they are fusion bonded with adjacent particles on a surface.

Furthermore, the heating process performs heating in a temperature at which binder resins of the first non-woven fabric 22 and binder resins of the second non-woven fabric 24 are melted-through whereby the main fiber of the first non-woven fabric 22 and the main fiber of the second non-woven fabric 24 do not melt-through. Specifically, for example, heating is performed for a duration of 50-100 seconds within a temperature range 25-50° C. higher than the melting point of the powdery resins. In particular, in the case where the powdery resins are polyethylene powders (melting point: about 102° C.), the heating is preferably performed for a duration of 65-75 seconds at a temperature of 135-145° C.

Thereby, particle residue parts 30b in particulate form are distributed over an entire surface of a melted-through fusion bonded resin part 30a. After the powdery resins are cooled, minute pores are formed between powder particles maintaining in particulate form so that a porous resin layer 30 is formed.

In addition, in this embodiment, exposure fibers 21 exposed from the surface of the resin layer 30 piercing through the resin layer 30 are scattered. Minute pores are easily formed in the periphery of such exposure fibers 21 so that air ventilation can be secured easily.

The powdery resin is once in a melted-through state or half melted-through state due to this heating process so that heat can be easily conducted to bottom layers (the first non-woven fabric 22 and the second non-woven fabric 24) and molding becomes easy.

In addition, the weight per unit area of the powdery resin, the first non-woven fabric 22 and the second non-woven fabric 24 can be properly adjusted.

For example, when the sound absorbing material as vehicle exterior equipment according to the present invention is used as a fender liner, for usage in a cold area, the powdery resins can be adjusted within a range of 50-300 $g/m^2$, the first non-woven fabric 22 can be adjusted within a range of 300-500 $g/m^2$, the second non-woven fabric 24 can be adjusted within a range of 500-1500 $g/m^2$. By adjusting within such ranges, the degree of hardness, stiffness and water-repellent property of the first non-woven fabric 22 become higher.

In addition, because the weight per unit area of the first non-woven fabric is large, the thickness thereof becomes thick so that snow accretion and ice accretion become difficult to reach the second non-woven fabric 24 and can easily break off, therefore making it well-suited for a cold area.

For usage in a warm area, the powdery resins can be adjusted within a range of 50-300 $g/m^2$, the first non-woven fabric 22 can be adjusted within a range of 100-300 $g/m^2$, the second non-woven fabric 24 can be adjusted within a range of 500-1500 $g/m^2$. By adjusting within such ranges, in comparison to the above-described sound absorbing material as vehicle exterior equipment suited for usage in a cold area, the weight per unit area is small and the ratio of binder fiber is low so that cheap manufacturing is realized. Therefore, such a material is well suited for usage in a warm area where a high degree of hardness, stiffness and water-repellent property are not required in comparison to a cold area.

The heated sheet body is compressed and molded (step S6).

In the compression process, the heated sheet body should at least be compressed and molded into a thin sheet shape but the heated sheet body can also be molded into a shape fitting the installation part while being simultaneously compressed.

In the present embodiment, the surface of the fender liner 10 is cooled during the compression process using a compressor having a water-cooled interior part and a compressive surface with cooling effect. In such a way, the compression process is finished by cooling only the surface so that the stability of the shape is secured. The fender liner 10 in its entirety is cooled by a separate process afterwards so that production efficiency is heightened.

In addition, the compression process can be implemented together with heating so that the above-described heating process (step S5) can possibly be abbreviated.

According to the present invention, the powdery resins are melted-through in the compression process so that moldability and workability are good. For example, when resin films are attempted to be molded three dimensionally, poor tensibility is shown. But like the present invention, by adopting the powdery resins, the powdery resins are melted-through in the heating process so that tensibility is high and excellent moldability and workability are shown.

Then the fender liner 10 is cooled in its entirety by an air-cooling method or the like (step S7) and cut out (step S8).

In the manufactured fender liner 10, foreign substances of water, dirt, dust, snow and ice or the like hardly adhere to the resin layer 30 facing outwards despite its coarse surface and porous structure. In such a way, a sound absorbing material as vehicle exterior equipment according to the present invention does not require smoothing of the surface of the resin layer so that manufacture is easy. In addition, in the fender liner 10, sound can be absorbed through the minute pores of the porous resin layer 30 by the non-woven cloth layers (the first non-woven cloth layer 22 and the second non-woven cloth layer 24) of the vehicle body side with excellent sound absorbing properties.

In such a way, according to the present invention, the fender liner as a sound absorbing material as vehicle exterior equipment has excellent water-repellent properties and sound absorbing properties while also curbing manufacturing costs. In addition, a manufacturing method according to the present invention can manufacture easily and cheaply such a sound absorbing material as vehicle exterior equipment.

EMBODIMENT OF THE INVENTION

A sound absorbing material 10 as vehicle exterior equipment (sample 2-sample 4) is manufactured according to the manufacturing method described based on FIG. 2 and FIG. 3.

In the present embodiment, a water-repellent test of finished products of the sound absorbing material 10 as vehicle exterior equipment is performed by changing only the quantity of powdery resins used for the resin layer 30. Specifically, the applied quantity of polyethylene powder as the powdery resins is zero in sample 1 (comparison example), is 100 $g/m^2$ in sample 2, is 200 $g/m^2$ in sample 3, is 300 $g/m^2$ in sample 4, and the samples are respectively compared.

In samples 1-4, as raw materials of the first non-woven fabric 22, 50% polyethylene terephthalate fiber is used and a low melting point polypropylene fiber as the binder fiber is used for the remaining 50%. The weight per unit area is set to 200 $g/m^2$.

In addition, as raw materials of the second non-woven fabric 24, 50% polyethylene terephthalate fiber is used, 10% low melting point polypropylene fiber as the binder fiber is used and a low melting point polyethylene terephthalate fiber as the binder fiber is used for the remaining 40%.

In samples 2-4, polyethylene powders are used to form the resin layer 30 so that during heating, heat can easily transmit to the first non-woven fabric 22 and the second non-woven fabric 24 and manufacturing is easy.

At the time of compression and molding, a processing to smooth the surface of the resin layer 30 is not performed.

After compression and molding, a portion of particles of the polyethylene powders enter the first non-woven fabric 22 until the vicinity of the boundary surface 20b. The surface of the particles is melted-through and fusion bonded to the binder fiber and main fiber of the first non-woven fabric 22 (resin particles 30c).

Polyethylene powders remaining in particulate form (remaining particle part 30b) are formed in the resin layer 30 so that minute pores remain between the particle residue parts 30b and air ventilation is possible.

Figure 4:
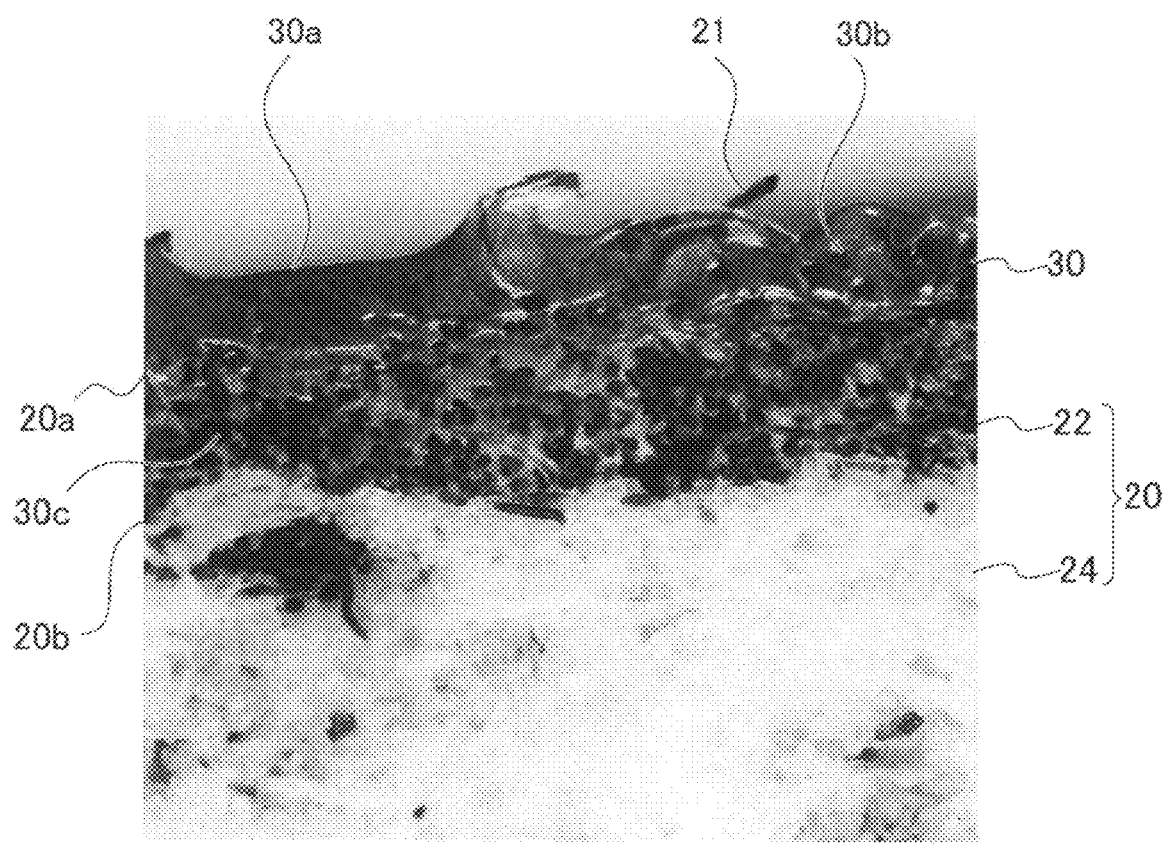
FIG. 4 is a partially enlarged photograph of a fender liner used as a sound absorbing material as vehicle exterior equipment according to an embodiment of the present invention.

A partially enlarged photograph of an example of the sound absorbing material as vehicle exterior equipment manufactured as such is illustrated in FIG. 4.

After compression, the sheet is cut into A4 sizes. In sample 1, a water-repellent test of the first non-woven fabric 22 is performed. In samples 2-3, water-repellent tests of the resin layer 30 are performed.

The water repellent test is performed according to the following method:

(1) Weight of each sample is measured (foundation weight);

(2) For sample 1, water weighing 10 g contained in a container is poured onto the surface of the first non-woven fabric 22. For samples 2-3, water weighing 10 g contained in a container is poured onto the surface of the resin layer 30;

(3) Water is poured back into the container after 5 seconds;

(4) Weight of each sample (after test weight) and weight of water poured back into the container are measured.

Test results of the water-repellent tests of each sample are illustrated in Table 1.

TABLE 1

Test Results of the Water Repellent Test

|  | Foundation Weight (g) | Weight after Test (g) | Water Return (g) |
| --- | --- | --- | --- |
| Sample 1 (comparison example/ without resin layer 30) | 55.16 | 60.26 | 4.75 |
| Sample 2 (resin layer 30: PE 100 g/m$^2$) | 62.24 | 65.07 | 7.10 |
| Sample 3 (resin layer 30: PE 200 g/m$^2$) | 68.46 | 69.01 | 9.40 |
| Sample 4 (resin layer 30: PE 300 g/m$^2$) | 75.35 | 75.45 | 9.90 |

From this test, it can be seen that the larger the quantity per unit area of the applied polyethylene powder, the more excellent the water repellent property. In particular, samples applied with 200 g/m$^2$ or more polyethylene powders are confirmed to have very high water repellent property when used as a sound absorbing material as vehicle exterior equipment even with the porous resin layer 30 facing outwards.

That is to say, by the manufacturing method of the sound absorbing material as vehicle exterior equipment according to the present invention, heating and molding can be performed more easily and a sound absorbing material as vehicle exterior equipment with high water repellent properties can be manufactured cheaply. In addition, with a porous resin layer as such, external sounds can be transmitted to and absorbed by the first non-woven fabric of the vehicle body side and/or the second non-woven fabric. In addition, the sound absorbing material as vehicle exterior equipment according to the present invention manufactured by such a manufacturing method has excellent water repellent property despite being porous and is especially well suited for a fender liner.

While an embodiment of the present invention is described in detail above with reference to the drawings, it should be understood that the embodiment is exemplary of the invention and the present invention is not limited to the embodiment. Therefore, modifications of design or the like in a range without departing from the scope of the present invention are necessarily included in the present invention.

The invention claimed is:

1. A sound absorbing material for use as vehicle exterior equipment, said material comprising:
  a non-woven fabric including main fibers and binder fibers; and
  a resin layer formed of heated powdery resin applied to a surface of said non-woven fabric, said resin layer including:
    a fusion bonding resin part formed of melted powdery resin particles; and
    a particle residue part formed of non-melted powdery resin particles, said fusion bonding resin part and said particle residue part being distributed throughout an entirety of said resin layer, said particle residue part being arranged and configured such that pores are formed in said resin layer between said non-melted powdery resin particles for allowing air ventilation from an outer surface of said resin layer to said non-woven fabric;
  wherein said resin layer is applied to said non-woven fabric such that exposed fibers of said non-woven fabric pierce through said resin layer and are exposed at said outer surface of said resin layer, a portion of each of said exposed fibers being in said resin layer, pores being formed at a periphery of said portion of each of said exposed fibers for allowing air ventilation from said outer surface of said resin layer to said non-woven fabric.

2. The sound absorbing material of claim 1, wherein a part of said resin layer enters said non-woven fabric such that a portion of said non-melted powdery resin particles are fusion bonded to said main fibers and/or said binder fibers of said non-woven fabric.

3. The sound absorbing material of claim 1, wherein said main fibers of said non-woven fabric comprise polyethylene terephthalate fibers, and said binder fibers of said non-woven fabric comprise low melting point polypropylene fibers and/or low melting point polyethylene terephthalate fibers having a lower melting point than said polyethylene terephthalate fibers of said main fibers.

4. The sound absorbing material of claim 3, wherein a weight per unit area of said non-woven fabric is in a range of 300-500 g/m$^2$, said polyethylene terephthalate fibers as said main fibers are in a range of 20-50 mass %, and said low melting point polypropylene fibers and/or said low melting point polyethylene terephthalate fibers as said binder fibers are in a range of 50-80 mass %.

5. The sound absorbing material of claim 3, wherein a weight per unit area of said non-woven fabric is in a range of 100-300 g/m$^2$, said polyethylene terephthalate fibers as said main fibers are in a range of 50-70 mass %, and a total of said low melting point polypropylene fiber and said low melting point polyethylene terephthalate fibers as said binder fibers is in a range of 30-50 mass %.

6. The sound absorbing material of claim 1, wherein said powdery resin is polyethylene powder, and an added quantity of said polyethylene powder is in a range of 50-300 g/m$^2$.

7. The sound absorbing material of claim 6, wherein a density of said polyethylene powder is in a range of 0.910-0.965 g/cm$^3$.

8. The sound absorbing material of claim 1, wherein said non-woven fabric comprises a first non-woven fabric, said sound absorbing material further comprising a second non-woven fabric superimposed to a surface of said first non-woven fabric, said surface of said first non-woven fabric being on an opposite side relative to said resin layer.

9. The sound absorbing material of claim 8, wherein:
  a weight per unit area of said second non-woven fabric is in a range of 500-1500 g/m$^2$,
  said second non-woven fabric including main fibers comprising polyethylene terephthalate fibers, said second non-woven fabric including binder fibers comprising low melting point polypropylene fibers and/or low melting point polyethylene terephthalate fibers having a lower melting point than said polyethylene terephthalate fibers of said main fibers.

10. The sound absorbing material of claim 9, wherein, in said second non-woven fabric, said polyethylene terephthalate fibers as said main fibers are in a range of 30-50 mass %, and said low melting point polypropylene fibers and/or said low melting point polyethylene terephthalate fibers as said binder fibers are in a range of 50-70 mass %.

11. The sound absorbing material of claim 1, wherein said sound absorbing material is installed on an exterior of a vehicle such that said resin layer faces away from the vehicle.

12. A method of manufacturing a sound absorbing material for use as vehicle exterior equipment, said method comprising:
preparing a non-woven fabric including main fibers and binder fibers;
applying a powdery resin to a surface of the non-woven fabric; and
heating the non-woven fabric and the powdery resin applied to the surface of the non-woven fabric so as to form a resin layer including:
a fusion bonding resin part formed of melted powdery resin particles; and
a particle residue part formed of non-melted powdery resin particles, the fusion bonding resin part and the particle residue part being distributed throughout an entirety of the resin layer;
wherein said heating is performed such that pores are formed in the resin layer between the non-melted powdery resin particles for allowing air ventilation from an outer surface of the resin layer to the non-woven fabric; and
wherein said applying of the powdery resin to the surface of the non-woven fabric and said heating of the non-woven fabric and the powdery resin is performed such that exposed fibers of the non-woven fabric pierce through the resin layer and are exposed at the outer surface of the resin layer, a portion of each of the exposed fibers being in the resin layer, and pores are formed at a periphery of the portion of each of the exposed fibers for allowing air ventilation from the outer surface of the resin layer to the non-woven fabric.

13. The method of claim 12, further comprising compressing the non-woven fabric and the resin layer during cooling after said heating.

14. The method of claim 12, further comprising applying the sound absorbing material on an exterior of a vehicle such that the resin layer faces away from the vehicle.

* * * * *